BEST AVAILABLE COPY
R. LAPHAM.
Improvement in Automatic Fire Extinguishers.
No. 4,855. Reissued April 9, 1872.
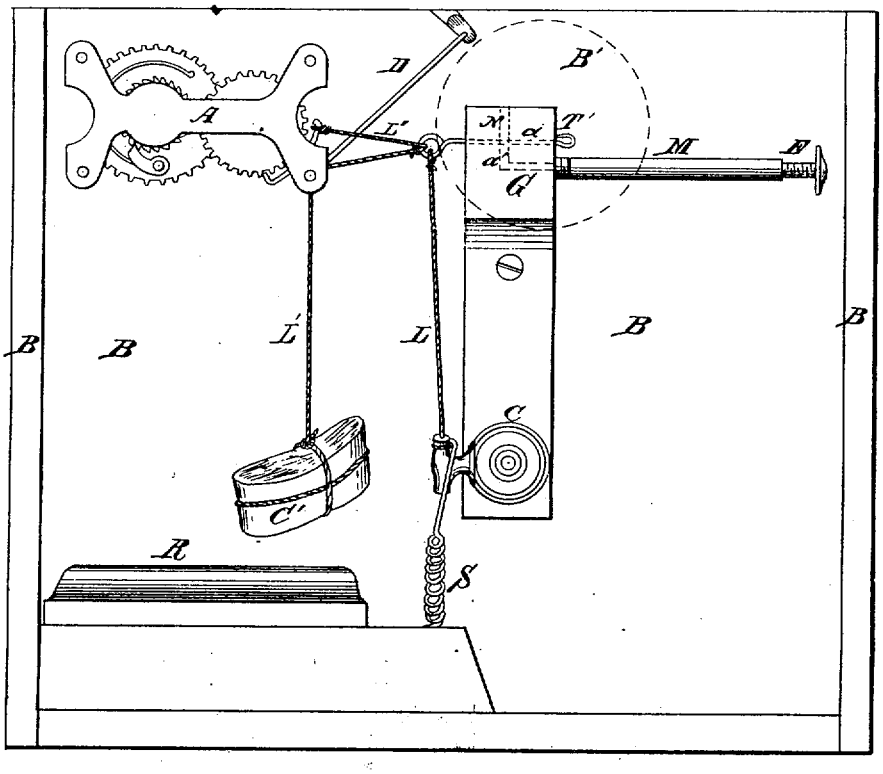
Witnesses:
Barry E. Ruder
Joseph T. DeBarry
Inventor:
Rufus Lapham
AM. PHOTO-LITHOGRAPHIC CO. N.Y. (OSBORNE'S PROCESS.)

UNITED STATES PATENT OFFICE.

RUFUS LAPHAM, OF NEW YORK, N. Y., ASSIGNOR, BY MESNE ASSIGNMENTS, TO PAUL P. TODD, OF SAME PLACE.

IMPROVEMENT IN AUTOMATIC FIRE-EXTINGUISHERS.

Specification forming part of Letters Patent No. 65,682, dated June 11, 1867; reissue No. 4,855, dated April 9, 1872.

Specification describing certain Improvements in Automatic Fire Extinguishers and Alarms, invented by RUFUS LAPHAM, of the city, county, and State of New York.

The nature of this invention consists in constructing fire extinguishers and alarms in such a manner, and by the employment of suitable materials, that the increase of heat, or the flame produced by the breaking out of a fire, shall immediately cause an alarm to be given and chemicals brought together which shall generate carbonic-acid gas in the room on fire, or to cause water, steam, gas, or any other extinguishing agent to be let into the room upon the fire, thereby making the fire itself give its own alarm and put itself out; all working automatically.

In the accompanying drawing, the outlines B B may represent the walls of a room; A, an alarm movement attached to the wall or ceiling, and having a hammer, D, acting upon the bell B′, which may be attached inside or outside of the building. M is a mercury pipe or tube entering an upright block or tube, N; E, a screw by which the altitude of the mercury in N is regulated. T T′ is a thin piece of block-tin, or any other metal which will readily amalgamate with mercury passing loosely through N just above the tube M, and crossing the hole *a* in N which meets that of the tube M. L L′ L″ are small cords or wires, one being attached to the tin T T′ and to the pallet of the alarm, another to the tin T T′ and to the package or vessel C′ containing carbonate or bicarbonate of soda, and the other attached to the tin T T′ and to the handle of the cock C. S is a spiral spring, also attached to said handle. R is a vessel for holding sulphuric acid just below the package C′.

Now, suppose the tube M is filled with mercury to a level, (say *a*′,) and the alarm A wound up and held from running down by the cord L″ attached to the pallet, and suppose the vessel R be one-third filled with diluted sulphuric acid, and the cock C to be shut; now, if the tin T T′ be cut off, the cords L L′ L″ will all be loosened, causing the alarm to ring, the soda to drop into the acid, and the spring S to act, opening the cock C, through which carbonic-acid gas or any other extinguishing agent kept in reserve in a suitable reservoir can flow into the room. The carbonate of soda brought thus into contact with the acid will immediately generate carbonic-acid gas, which, impregnating the atmosphere of the room, will extinguish the fire. Now, to cut the tin T T′ automatically, and accomplish thereby these desirable results, the mercury in the tube M is a certain agent. The increase of heat occasioned by the fire will cause the mercury to expand, and to rise and cover the tin at *a*, and, forming an amalgam with the tin, will either sever it at once, or make it so devoid of strength that a slight weight or draw upon it will pull it apart. The package C′ and the spring S answer for such a weight. The tin being thus severed the desired objects are thereby obtained.

The tube M may extend across the whole room, and have several branches entering it cross-wise and even may extend into adjoining rooms, or there may be several of them in one room acting independent of each other. The cock C may connect by a pipe to a reservoir at a distance containing carbonic-acid gas, one reservoir serving for many buildings—probably for a whole city—or different reservoirs may be used.

To avoid all dangers from the gas during occupancy of the room the package C′ can be easily drawn aside, so that there could be no possibility of danger of its falling into the acid, and then very easily replaced on leaving; but in all cases the alarm will give seasonable notice of escape.

The tube M may hang vertically and be made of glass, like a thermometer, having thereon indices to indicate the degrees of heat, but open at the top to allow the mercury to overflow onto the tin T T′ whenever the fire shall break out in the room, or the tube M may be covered on one end by an elastic covering, against which the mercury can expand without any escape, pressing it outward, and to this elastic covering may be attached a lever or slide, which will move by the expansion, allowing the alarm to ring, the chemicals to be brought together, and the cock C to open to admit carbonic-acid gas or any other extinguishing agent from the reservoir; or, instead of the elastic covering, a plunger or stopple may be inserted in the end of the tube M, to which a lever or slide may be attached, accomplishing the same results. In both these cases the tin T T′ is dispensed with.

What I claim, and desire to secure by Letters Patent, is—

1. The application of the expansion of mercury by the heat produced by the breaking out of a fire in a room to cause an alarm to be given.

2. The application of the expansion of mercury by the heat produced by the breaking out of a fire in a room or rooms to cause chemicals that produce carbonic-acid gas to be brought together, substantially in the manner and for the purpose hereinbefore described.

3. The application of the expansion of mercury by the heat produced in a room or rooms by the breaking out of a fire in the same to sever a wire or its equivalent, with which mercury readily amalgamates, for the purpose set forth.

4. The application of the expansion of mercury, by the heat produced in a room or rooms by the breaking out of a fire, to cause a cock or its equivalent to open for the purpose of letting in any extinguishing agent kept in a reservoir, substantially as specified.

5. A reservoir constructed for containing carbonic acid or equivalent fire-extinguishing gas, with one or more pipes or passages leading therefrom to one or more rooms or buildings, with which they communicate stop-cocks worked automatically or by hand, all in combination, for the purpose set forth.

6. I claim, generally, for all purposes to which it is adaptable, arranging a tin wire or its equivalent, with which mercury readily amalgamates, in such a relation to the mercury that when expanded by heat it shall unite with said wire or its equivalent, and cause it to be separated.

RUFUS LAPHAM.
PAUL P. TODD.

Witnesses:
HENRY E. RŒDER,
JOSEPH S. DEBARRY.